Jan. 13, 1970            H. P. HICK            3,489,902
DISTURBANCE SUPPRESSING RADIATION DETECTOR
Filed Dec. 8, 1966
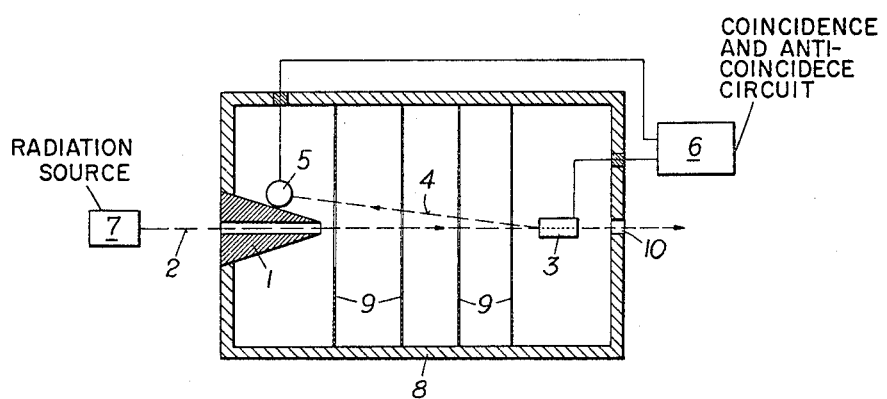

United States Patent Office 3,489,902
Patented Jan. 13, 1970

3,489,902
DISTURBANCE SUPPRESSING RADIATION
DETECTOR
Harald Peter Hick, Vienna, Austria, assignor to Osterreichische Studiengesellschaft fur Atomenergie Ges. m.b.H., Vienna, Austria, a corporation of Austria
Filed Dec. 8, 1966, Ser. No. 600,151
Claims priority, application Austria, Dec. 10, 1965,
A 11,147/65
Int. Cl. G01t 1/16; H01j 39/00
U.S. Cl. 250—83.3    5 Claims

ABSTRACT OF THE DISCLOSURE

A disturbance suppressing radiation detector comprising a housing and a collimator therein, a first detector positioned within the housing for receiving primary radiation through the collimator and causes a secondary, scattered radiation. At least one second detector is disposed within the housing in the range of the secondary scattered radiation, and at least one radiation shield is disposed within the housing extending substantially from the interior walls of the housing at a position intermediate to the first detector and the second detector up to but short of a straight line path of the secondary scattered radiation between the first and second detectors.

---

The present invention relates to a radiation detector, in general, and to an apparatus for the suppression of disturbances during the measuring of physical characteristics of X-rays, particularly in connection with nuclear fuel elements in particular, whereby a first detector and within the range of the return beam of this detector one or a plurality of second detectors are provided within the path of the radiation.

It is one object of the present invention to provide an apparatus for suppression of disturbances during the measuring of physical characteristics of X-rays, wherein collimators and shieldings, respectively, are provided between a detector for the direct radiation and a detector or detectors for the back radiation.

With these and other objects in view, which will become apparent in the following detailed description, the present invention will be clearly understood in connection with the accompanying drawing, in which the sole figure discloses a diagrammatic showing of the present invention.

Referring now to the drawing, a radiation source 7 is provided which can be, for instance, a portion of a nuclear fuel element, the burn-up state of which is to be determined.

The radiation 2 originating from the radiation source 7 passes for selection of a radiation beam through a collimator 1. The radiation beam impinges then on a detector 3 which is, for instance, a semi-conductor detector and emerges from a housing 8 through an opening 10 in the rear wall. Due to the radiation impinging upon the semi-conductor detector 3, in accordance with the Compton-effect, one portion of the energy is transmitted to an electron, while the other portion of the energy is reflected in form of scattered radiation 4. The release of this radiation can take place under any selected angle. For the measurement, a particular predetermined angle is now selected and the scattered radiation 4 is received at this angle by one or a plurality of detectors 5. These detectors 5 can comprise, for instance, sodium iodide crystals.

As illustrated in the drawing, the scattered radiation 4 preferably defines an angle relative to the radiation 2 of about 180°. Any other angle is, however, also feasible.

The pulses produced in the elements 3 and 5 by the beams 3 and 4, respectively, cooperate in a coincidence and anti-coincidence circuit 6, respectively, so that the desired result is obtained in a measuring device.

Since, however, as stated above, the reflected or scattered radiation 4 can emerge in the entire space angle, the possibility exists that the radiation scattered in a direction other than the desired direction, for instance, at the wall of the housing 8, in turn, is again reflected and causes another secondary radiation, respectively, which reaches the detectors 5 and, thus, causes disturbances in the measuring result.

It has now been proposed in accordance with the present invention to provide collimators and shields, respectively, between the detector 3 and the detectors 5. By this arrangement, it is assured that only scattered radiation 4 in the selected direction directly from the detector 3 can arrive at the detectors 5. The simplest embodiment for such shields are annular metal sheets 9 of a shielding material, for instance, lead. A plurality of annular metal sheets is disposed thereby behind each other, with the inner periphery of each stepwies varied to form a series of progressively larger openings through which the scattered radiation passes. The shields 9 extend substantially from the housing 8 to their inner peripheries up to but short of the straight line of the desired scattered radiation path between the detectors 3 and 5.

It is also possible, however, to provide a single shield only, the penetration bore of which must then be designed, however, such, that the radiation impinging upon the inner walls in the direction toward the detectors 5 can release neither reflections nor secondary radiations. Thus, one can, for instance, provide the penetration bore of the shields with stepwise undercuts.

By the arrangement of collimators and shields, respectively, in accordance with the present invention, only the radiation emerging under the selected angle arrives at the detectors 5. Any other radiation in the direction to the detectors 5 is caught by the collimator and the shields, respectively.

While I have disclosed one embodiment of the present invention, it is to be understood that this embodiment is given by example only and not in a limiting sense, the scope of the present invention being determined by the objects and the claims.

I claim:
1. An apparatus for the suppression of disturbances during the measuring of physical characteristics of radiation emitting from a radiation source, comprising
   a housing including interior walls,
   a first detector means disposed within said housing,
   a collimator disposed in said housing and having a collimator opening,
   said first detector means disposed within the path of said collimator opening receiving primary radiation from a radiation source passing through said opening and for producing a secondary scattered radiation,
   at least one second detector disposed within said housing in the range of said secondary scattered radiation, and out of the range of said primary radiation,
   at least one radiation shield disposed within said housing extending substantially from said interior walls at a position intermediate to said first detector means and said at least one second detector up to but short of a straight line between said first and said at least one second detector.
2. The apparatus, as set forth in claim 1, wherein
   said at least one radiation shield is formed with a shield opening substantially aligned with a line between said collimator opening and said first detector means, and said scattered secondary radiation passing through said shield opening.

3. The apparatus, as set forth in claim 2, wherein said at least one radiation shield comprises a plurality of substantially annular sheets spaced apart from one another coaxially disposed at said shield openings, respectively, and said shield openings of said plurality of substantially annular sheets, respectively, increase in size stepwise closer to said at least one second detector.

4. The apparatus, as set forth in claim 1, wherein said at least one second detector is disposed such that said straight line between said first detector means and said at least one second detector, and a second line between said collimator opening and said first detector means form an angle of almost 180°.

5. The apparatus, as set forth in claim 1, wherein said at least one second detector is positioned adjacent said collimator at a position remote from said collimator opening, thereby being shielded from said primary radiation.

References Cited

UNITED STATES PATENTS

| | | | |
|---|---|---|---|
| 2,830,185 | 4/1958 | Scherbatskoy | 250—71.5 |
| 3,324,294 | 6/1967 | McGrath | 250—105 |
| 3,046,430 | 7/1962 | Green | 250—106 X |

RALPH G. NILSON, Primary Examiner

D. L. WILLIS, Assistant Examiner

U.S. Cl. X.R.

250—105, 108